May 26, 1959

H. B. SEDGFIELD 2,888,256

ACCELEROMETERS

Filed April 11, 1951

INVENTOR
HUGH B. SEDGFIELD
BY
his ATTORNEY.

Patented May 26, 1959

2,888,256
ACCELEROMETERS

Hugh Brougham Sedgfield, Hampton, England, assignor, by mesne assignments, to The Sperry Gyroscope Company, Limited, Brentford, England, a British company Application April 11, 1951, Serial No. 220,496

Claims priority, application Great Britain April 12, 1950

5 Claims. (Cl. 264—1)

The present invention relates to apparatus adapted to measure accelerations or inclinations of a support or platform on which the apparatus is mounted. Such devices are usually referred to as accelerometers or inclinometers respectively according as they are arranged or intended to respond primarily to accelerations or inclinations of the platform. It is well-known that there is no fundamental distinction between an accelerometer or an inclinometer since either is responsive to the resultant forces acting upon the elements of the apparatus due on the one hand to the acceleration reactions set up in the mass element when the platform is accelerated, and to gravity on the other hand. Generally speaking, an accelerometer or inclinometer is arranged to respond to the resultant of the acceleration and gravitational forces acting on a movable element or test-mass suspended in or from a base or support with freedom to move relatively thereto and in most cases it responds to a component of this resultant force along a direction defined relatively to the base or support owing e.g. to the nature of the suspension of the movable element in or from the support.

Hereinafter, whether the apparatus be intended for use as an accelerometer or an inclinometer, we may refer to it simply as an "accelerometer" and similarly, we may refer to the resultant force acting on the movable element compounded from its weight and its reactions against acceleration simply as the "acceleration force" acting on the test-mass. As has already been mentioned, the apparatus is responsive to a component of this resultant force along a direction defined relatively to the suspension; hereinafter we shall refer to this direction as the "direction of measurement" and the component of the aforesaid resultant force along this direction as the "effective acceleration force" acting on the movable element. In conformity with this understanding, we may refer to the component of the resultant of the accelerations of the platforms and of gravity reversed, as the "effective acceleration" of the platform. Hereinafter, therefore, the terms "acceleration" and "accelerometer" may have meanings broader than those normally accepted, as fits the context in which they are used.

It has previously been proposed to provide accelerometers and inclinometers in which the test-mass is suspended from a support by means of a spring system in such a manner that when accelerations are imparted to the support, a relative displacement occurs between the mass and the support, and in which means are provided for measuring this relative displacement, the measurement of displacement so obtained being used as a measure of the acceleration. Such devices are suitable where great accuracy is not required, but are not capable of use for measuring accelerations with precision over a range of values of acceleration that is very large compared with the precision required. Among the reasons that contribute towards this lack of precision is the difficulty in realising a spring suspension in which the relative displacement is proportional to the applied force over a wide range of values of force, and in which the zero position of the test-mass when centralised by the suspension system in the absence of externally supplied force is not liable to change owing to secular changes in the materials forming the spring suspension or owing to temperature changes.

In copending application S.N. 151,068, filed on March 22, 1950 in the names of Marcus Lionel Jofeh, Rudolf Albrecht, and the present applicant there has been described and claimed apparatus for measuring accelerations or inclinations of a movable body, comprising an acceleration-detecting instrument having a support and a test-mass suspended in or from it so as to be capable of moving relatively to it when the body is accelerated, wherein a restoring force proportional to a quantity governing its application is applied to the test mass, after it has become displaced relatively to the support as a result of acceleration of the support, to urge the mass to return towards its zero position relative to the support, and wherein the governing quantity is used to provide a measure of the acceleration. In order to enable the restoring force to be applied, a displacement-detector is provided for detecting relative displacement of the test-mass and its support, and for providing an indication or a control quantity external to the instrument according to which the application of the restoring force may be governed.

In general the information that is required on a moving craft from an accelerometer device is not simply the measure of the acceleration that is directly provided by the accelerometer. One reason for this is that an accelerometer carried on a moving craft is responsive to the resultant gravity-acceleration field; in other words, it measures the resultant of acceleration and reversed gravity. As a rule it is desired to obtain from the measure provided either a measure of acceleration in a definite direction or a measurement of the tilt of the support relative to gravity. For this reason it is usually necessary to provide some method of correctly orienting an accelerometer to be used on a moving craft. Frequently an accelerometer is described to measure horizontal accelerations, and arrangements are therefore provided to stabilise it so that it responds only to accelerations along a particular stabilized direction defined in the body of the accelerometer.

In such cases where the direction of measurement of acceleration is stabilised, it may be considered that the extent to which the accelerometer responds to gravity does not constitute a material error, for the purpose in hand, in the measure of acceleration provided. Nevertheless, even in such cases, the measure of acceleration provided is not always the quantity desired. Usually a measure of acceleration is desired in order to derive from it some information connected with changes in the velocity of a craft on which the accelerometer is carried. For example, it may be desired to integrate the measure of acceleration provided by the accelerometer in order to obtain a measure of the speed of the craft relative to the medium in which it is moving. However, an accelerometer may respond not only to changes of the actual speed of the craft but also to a change in the direction of movement of the craft. For example, an accelerometer directed so as to measure accelerations in a direction generally normal to the direction of travel of the craft will indicate the presence of acceleration during a turn of the craft even although the speed of the craft is unchanged. This is because the craft must be given an acceleration towards the centre of the circle of turn if it is to carry out the turn. It is this acceleration to which the accelerometer responds. Its magnitude is $\omega v$, where $\omega$ is the angular velocity of the craft about the centre of turn, and $v$ is its velocity relative to the medium.

More generally, it may be said that any accelerometer carried on a craft moving with respect to a frame of reference may be considered to be made up not only of a component corresponding to change in the speed of the craft relative to that frame of reference but also of components corresponding to rotation effects, i.e. to turning in space of the velocity of the aircraft relative to the frame of reference.

It is, therefore, frequently desirable to "correct," or rather, falsify, the measures of acceleration provided by an accelerometer, so that they may be measures of changes in the speed of the craft relative to a frame of reference, and not respond to those components of the acceleration that are due to turning in space of the craft's velocity. For this purpose it is necessary to correct, or modify, the measure of acceleration by one, or sometimes two, correcting quantities, each corresponding to the turning, about some axis, of the velocity, or of a component of the velocity, of the craft in a known direction. The correctional term, or each such correctional term, that should be applied is the product of the rate of turn about the axis in question and the velocity, or a component of the velocity, of the craft in the relevant direction. In other words, each such term is a quantity $\omega v$, where $\omega$ is some rate of turn and $v$ is some velocity.

It is an object of the invention to provide a simple and effective means of "correcting," or modifying, the output of an accelerometer by adding to it, or subtracting from it, a correcting term $\omega v$ which is the product of two known quantities $\omega$ and $v$, whose measures are known. For example, on a moving craft, $\omega$ may be a quantity measuring the rate of turn of the craft about its centre of turn, and $v$ may be the velocity of the craft relative to the medium. A feature of the method of applying this correction in accordance with the invention is that the quantity, or each of the correcting quantities, can be made instantaneously proportional to each of the quantities $\omega$ and $v$ of which it should be the product to a high degree of accuracy.

According to the invention in one of its aspects there is provided apparatus adapted to provide a measure of acceleration corrected by the product of two given quantities, comprising an accelerometer adapted to measure accelerations by virtue of the effect of accelerations in causing displacement of a movable element of the accelerometer relative to a fixed element, comprising: a coil connected to the movable element of the accelerometer so as to move in the field of an electromagnet, when the movable element of the accelerometer moves with respect to the fixed element, in such manner that the flux linkages between the coil and the field are varied: and means for supplying currents proportional to the two given quantities, one to the coil, and the other to an exciting winding that produces the flux in said electromagnet, whereby a force is applied to said movable element dependent on the product of the two currents, and therefore proportional to the said two given quantities.

According to the invention in another of its aspects there is provided an accelerometer adapted to be used in the aforesaid apparatus comprising an accelerometer adapted to measure accelerations by virtue of the effect of accelerations in causing displacement of a movable element of the accelerometer relative to a fixed element, comprising, in addition to such parts as are used in providing an uncorrected measure of acceleration; a coil connected to the movable element of the accelerometer so as to move in the field of an electromagnet, when the movable element of the accelerometer moves with respect to the fixed element, in such manner that the flux linkages between the coil and the field are varied; and connections for leading in currents one to the coil, and the other to an exciting winding that produces the flux in said electromagnet.

The invention is particularly applicable to accelerometers in which the movable element is mounted for linear movement relatively to the fixed element along an axis, which, therefore, is in the direction in which the accelerometer is responsive to acceleration.

When the invention is applied to an accelerometer of this kind the movable element preferably includes a shaft extending along the axis of the movable element and carrying at least one coil that is arranged to be coaxial with the shaft and to lie in the field of an electromagnet also coaxial with the shaft and having an energising winding mounted on it.

The invention may advantageously be applied to an accelerometer as described and claimed in the aforesaid copending application S.N. 151,068, which is of the aforesaid kind, and has the special feature that the movable element is maintained at substantially a zero position by electromagnetic forces applied by the interaction of a fixed permanent magnet and a coil on the movable element which is fed with current under the control of a pick-off device that measures displacement of the movable element relative to the fixed element.

The invention as applied to an accelerometer of the kind described and claimed in the above-mentioned copending application S.N. 151,068 will now be described with reference to the accompanying diagrammatic drawings in which:

Figure 1:
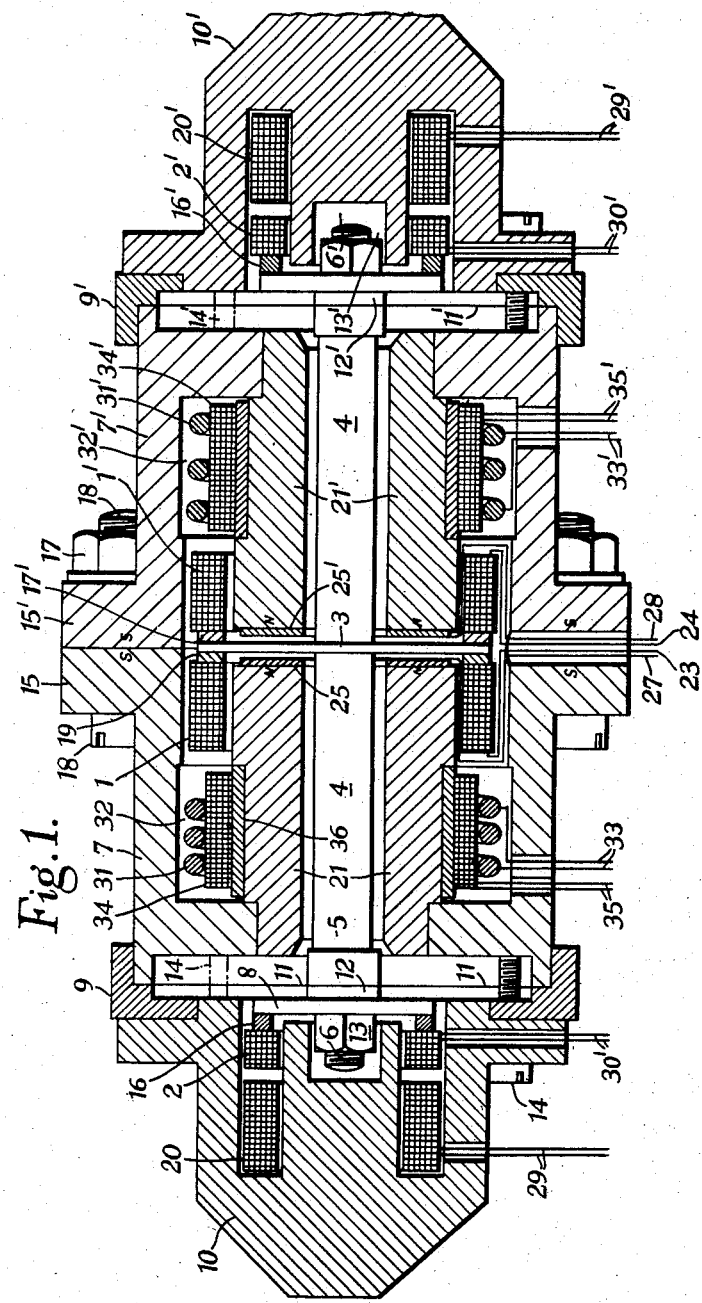
Fig. 1 shows an accelerometer in part cross-sectional elevation.

Referring to Fig. 1 the movable element of the accelerometer comprises two annular coils 1 and 1' mounted on the two opposite faces of a disc 3 that is integral with a concentric shaft 4 and also two further annular coils 2 and 2' mounted respectively on discs 8 and 8'. At each end the shaft 4 is provided with a shoulder portion 5 and a threaded extension 6. The disc 3, the shaft 4, the shoulders 5 and 5', and the extensions 6 and 6' are made of non-magnetic material and are preferably turned from a single piece of the copper-nickel alloy sold under the trade name "Constantan." The supporting casing in which the movable element is mounted comprises two central portions 7 and 7', two caps 9 and 9' and two end pieces 10 and 10'. The two central portions 7 and 7' are flanged at 15 and 15' so that they may be secured together by nuts 17 and bolts 18 in a convenient manner. The end pieces 10 and 10' and the caps 9 and 9' are secured to the central portions by screws 14. The movable element is mounted in the supporting casing by means of a resilient suspension made up of filaments 11 and 11' each of which is clamped at one end between the shoulder 5 (or 5') and a boss 12 (or 12') formed on the disc 8 (or 8') by means of a nut 13 (or 13'), and at the other end between the central portion 7 (or 7') and the cap 9 (or 9'). Thus the movable element suspended by the wires 11 and 11' may move axially of the instrument but not appreciably in any other direction.

The central portions 7 and 7' are made of soft iron and form part of a magnetic circuit which includes magnets 21 and 21'. Each of these magnets 21 and 21' is of tubular construction and is secured at one end to the central portion 7 (or 7') preferably by being shrunk into a suitable hole therein. The two magnets have the ends facing each other of the same polarity, for example as shown. Thus the whole magnetic system forms what may be termed a "double pot magnet" and comprises two distinct magnetic circuits each of which is similar in construction to the magnet used in a moving-coil loudspeaker.

The coils 1 and 1' are secured to the disc 3 through the medium of insulating rings 19 and 19' by means of adhesive on the various contacting surfaces. Each of the coils 1 and 1' is located in an air gap in the magnetic circuit of one of the magnets 21 and 21'. Leads 23 and 24 from the coils 1 and 1' are taken through a suitable aperture in the casing. When no current is flowing through the coils 1 and 1' and when no acceleration force is applied to the movable element it remains at rest centered between the two magnets.

The coils 2 and 2' are secured respectively to the discs 8 and 8' through the medium of insulating rings 16 and 16' by means of adhesive on the various contacting surfaces. Each of the coils 2 and 2' is located in an air gap between the inner and outer portions of the soft iron end cap 10 (or 10') which forms an electromagnet capable of being energised by coil 20 (or 20') wound on a suitable former and also located in the gap between the inner and outer portions of the end cap. Leads 29 and 30 from winding 20 and coil 2 are taken through suitable apertures in the casing. Since the end caps 10 and 10' are made of soft iron there is no appreciable magnetic flux across the gap in which the coils 2 and 2' are located unless a current is flowing through the appropriate energising winding 20 (or 20'). When a current flows through winding 20 (or 20') there will be a difference of magnetic potential across the gap in which the coils 2 and 2' are located and the radial magnetic flux across this gap will be substantially proportional to the magnitude of the current flowing in the winding. The sense of this potential difference and therefore the direction of the magnetic flux will depend on the direction of the current in winding 20 (or 20') according to a well-known law. As the disc 8 is of non-magnetic material (preferably the same copper-nickel alloy as disc 3) this magnetic flux will not exert any force on the movable element unless a current is flowing in coil 2 (or 2'). However when a current flows in coil 2 (or 2'), a force will be applied to the coil and hence to the movable element tending to move it in one direction or the other along the axis of shaft 4. The magnitude of this force will depend on the product of the magnitudes of the currents flowing in the coil 2 and winding 20 (or coil 2' and winding 20'), and its sense will depend on the directions of these two currents.

Secured to the centre poles of the magnets 21 and 21' by any suitable means, such as an adhesive, are annular plates 25 and 25' of quartz having a layer of metal sprayed on their outer faces, that is on the faces facing towards the disc 3. Leads 27 and 28 are secured to the metal surfaces and are led outside the casing through an aperture therein. Thus the metal surfaces of plates 25 and 25' co-act with the disc 3 to form a differential capacitor. Preferably the disc 3 is earthed to provide a convenient connection thereto. It is this differential capacitor that acts as the pick-off device measuring displacement of the movable element hereinabove referred to.

It is preferable for the pot magnets 21 and 21' to be permanent magnets, but it is extremely difficult to assemble an apparatus such as has been described without knocking the magnets and thus de-magnetising them slightly. It is necessary to have a completely reliable magnet system of known strength and therefore electromagnets would in some cases be inconvenient. Therefore the magnet system is arranged to be magnetised after assembly into the apparatus. To this end windings 31 and 31', of thick gauge wire able to carry a heavy magnetising current, are located in the suitably fabricated recesses 32 and 32'. Leads 33 and 33' are used to connect the windings to a suitable source of current (not shown). The magnet system may thus be magnetised to a predetermined strength after assembly and the leads 33 may then be disconnected and sealed off. Even so the strength of the magnet system will vary slightly with temperature and therefore, to allow for temperature compensation, temperature-sensitive windings 34 and 34' are provided adjacent the magnets. These windings are bifilar so that any current flowing through them has no effect on the magnetisation of the magnets 21 and 21' and are connected by leads 35 and 35' to a manganin-resistance temperature-compensating network of any known form which is used to detect temperature variations of the system and to operate means for compensating such variations. The windings are electrically insulated from the magnets but are kept in intimate thermal contact with them by means of brass sleeves 36 and 36'.

Figure 2:
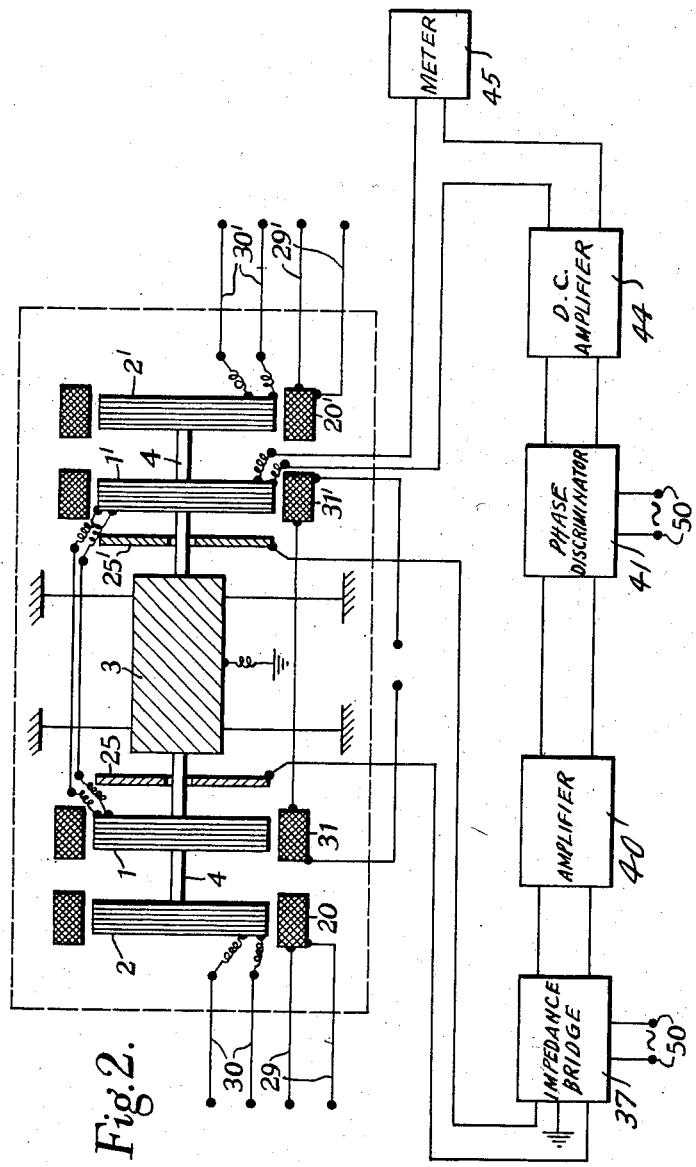
Fig. 2 shows a block diagram of the circuit arrangements for acceleration-measuring apparatus according to one aspect of the invention.

Referring now to the block diagram (Fig. 2) the differential capacitor 25, 3, 25' is connected into and forms part of an impedance bridge 37 energised from terminals 50 of a source of alternating current. When any acceleration forces are imparted to the casing of the apparatus, the test-mass formed by coils 1 and 1', disc 3, and shaft 4, together with coils 2 and 2' and discs 8 and 8', will tend to move, as a result of which movement the spacing of the plates of the differential capacitor will vary. The impedance bridge 37 is so arranged that when the disc 3 is mid-way between the metal surfaces of plates 25 and 25' the bridge is balanced and has zero output. When the spacing of the plates is varied an alternating-current signal is produced at the output of the bridge having a phase-rotation dependent upon the sense of movement of the movable element and an amplitude dependent on the amount of this movement. This signal is amplified in amplifier 40 and fed to a phase-sensitive rectifier or discriminator 41 having a reference input from A.C. terminals 50 to produce a direct-current signal at its output terminals. The sense of this direct current will then arbitrarily indicate the sense of the displacement of the movable element, and its magnitude will be proportional to that displacement. This direct current is amplified in a direct-current amplifier 44 and fed back to the coils 1 and 1' to urge the movable element to return to the position in which the impedance bridge is balanced. The current fed back to the coil may be passed through a suitable meter 45 to give a measure of the acceleration imparted to the system. Since the variations of the capacitance of the differential capacitor 25, 3, 25' are very small, the leads connecting the plates 25 and 25' to the impedance bridge 37 must be kept very short and consequently the impedance bridge and also the amplifier 40 (or at least the first stage of this amplifier) are preferably mounted on the accelerometer casing.

As has been stated above, it is frequently desirable to modify the measures of acceleration provided by the accelerometer by subtracting therefrom one or two correcting quantities, each of which, in the case of an accelerometer mounted on a moving craft, corresponds to the turning about some axis of the velocity, or of a component of the velocity, of the craft in a known direction. The correcting quantity, or each correcting quantity, that it is desired to apply is the product of the rate of turn about the axis in question and the velocity, or a component of the velocity, of the craft in the relevant direction. When such modifying action is required use is made of the forces that may be exerted on the movable element by currents flowing in the coil 2 (or 2') and the winding 20 (or 20'). Leads 29, 30, 29' and 30' are provided to enable these currents to be supplied from external devices arranged to compute them, e.g. in the manner shown in copending application S.N. 215,221 filed on March 13, 1951 in the name of the present applicant.

In operation when the accelerometer is moved or positioned so that acceleration or gravitational forces act on the movable element to make it tend to move in either direction axially of the instrument, a restoring force is applied to it, so that its actual movement is very small, by means of electromagnetic force produced by the interaction between the current flowing through coils 1 and 1' and the magnetic fields produced by the pot magnets 21 and 21'. The current flowing through coils 1 and 1' is a measure of the restoring force required to return the movable element to (or very nearly to) its central position, and therefore of the acceleration or gravitational forces acting on it. When it is desired that the measure provided by the accelerometer should not be a measure of such forces but of some modified version of such forces, the necessary correcting quantities are applied to the accelerometer in the form of electric currents supplied over leads 29, 30, 29' and 30'. Assuming that neither the current supplied over leads 29 (or 29') nor that supplied over leads 30 (or 30') is zero, the interaction of the current flowing through coil 2 (or 2') with the magnetic field produced by the current flowing through winding 20 (or 20') produces an additional force on the movable element tending to displace capacitor plate 3 from its central position between the metal surfaces of plates 25 and 25'. As a result the current flowing through coils 1 and 1' is modified so that the restoring force is similarly modified until the movable element resumes its central position. In this way the measure indicated by meter 45 is a modified version of the acceleration or gravitational forces acting on the system. If no acceleration or gravitational forces are applied to the accelerometer it will provide a measure of the modifying quantities applied to it over leads 29, 30, 29' and 30'.

What is claimed is:

1. An accelerometer having a mass element displaceable with respect to a supporting member in response to an acceleration, said accelerometer including signal generating means for providing a signal dependent on the displacement of said mass element from a null position, electromagnetic means responsive to said signal for exerting a force on said mass element to restore the same to the null position thereof, said restoring force being a measure of said acceleration, a first coil mounted on said mass element, a first set of input leads for leading a current into said first coil, a second coil mounted on said supporting member adjacent to and coaxial with said first coil, and a second set of input leads for leading a current into said second coil, whereby the energization of said coils by the respective currents causes a force to be developed therebetween sufficient to modify the restoring force required to maintain said mass element at the null position thereof in an amount dependent on the product of the said currents.

2. The accelerometer of claim 1 wherein the supporting member is formed of a magnetically permeable material and comprises a portion extending axially within the first and second coils thereby to provide a common core for the two coils.

3. An accelerometer comprising a longitudinally-extending open-ended casing, a pair of end-caps for sealing the respective ends of said casing, said casing and said end-caps being of a magnetic material, an inertia element suspended intermediately of the ends of said casing for movement about a given position therein in response to accelerations directed longitudinally of said casing, signal generating means for providing a signal proportional to such movement, amplifying means for amplifying said signal, electromagnetic restoring means connected to the output of said amplifying means and adapted in response to said output to impart a force on said inertia element tending to restore the same to its given position on departure therefrom such that said output is a measure of the acceleration causing said departure, said casing forming part of the magnetic circuit of said restoring means, and electromagnetic biasing means comprising a movable coil fixed to one end of said inertia element and a fixed coil fixed to the end-cap adjacent said end of the inertia element, said coils being substantially coaxial with the sensitive axis of the accelerometer, said adjacent end-cap including a portion extending inwardly through said coils to provide a common magnetically permeable core therefor, whereby on simultaneous energization of said coils, an electromagnetic force in addition to said restoring force is exerted on said mass element for modifying said output of the accelerometer by an amount proportional to said energization.

4. The accelerometer of claim 3 wherein the restoring means includes a permanently magnetizable element, said accelerometer further including winding means wound about said magnetizable element, said winding means being provided with leads external of said accelerometer and being capable of carrying a magnetizing current via said leads sufficient permanently to magnetize said element whereby the latter may be permanently magnetized to a predetermined strength after assembly of said accelerometer.

5. The accelerometer of claim 4 further including means for rendering the permanently magnetizable element substantially magnetically insensitive to variations in ambient temperature.

References Cited in the file of this patent
UNITED STATES PATENTS

| | | |
|---|---|---|
| 2,117,894 | Lenehan | May 17, 1938 |
| 2,371,040 | Fisher et al. | Mar. 6, 1945 |
| 2,591,921 | Cosgriff et al. | Apr. 8, 1952 |
| 2,643,869 | Clark | June 30, 1953 |
| 2,697,594 | Stanton | Dec. 21, 1954 |